US012619629B2

(12) United States Patent
Singh

(10) Patent No.: US 12,619,629 B2
(45) **Date of Patent: \*May 5, 2026**

(54) INTELLIGENT METHOD TO COMBINE MULTIPLE BLOCKCHAIN BASED SMART CONTRACTS LEVERAGING GENERATIVE ARTIFICIAL INTELLIGENCE

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 151 days.

This patent is subject to a terminal disclaimer.

(21) Appl. No.: 18/377,596

(22) Filed: Oct. 6, 2023

(65) Prior Publication Data

US 2025/0117396 A1     Apr. 10, 2025

(51) Int. Cl.
*G06F 16/27*          (2019.01)
(52) U.S. Cl.
CPC .................................... *G06F 16/27* (2019.01)
(58) Field of Classification Search
CPC ....................................................... G06F 16/27
USPC ......................................................... 707/610
See application file for complete search history.

(56) References Cited

U.S. PATENT DOCUMENTS

| | | | |
|---|---|---|---|
| 10,012,265 B2 | 7/2018 | Habibvand et al. | |
| 10,225,076 B2 | 3/2019 | Leng et al. | |
| 11,010,403 B2 | 5/2021 | Gray | |
| 11,115,804 B2 | 9/2021 | Mercuri | |
| 12,236,542 B1 * | 2/2025 | Huddy ................. | G06T 19/006 |
| 2023/0014140 A1 * | 1/2023 | Haney ................. | G06F 16/2379 |
| 2023/0129576 A1 * | 4/2023 | Root .................... | G06Q 20/389 |
| | | | 705/39 |
| 2024/0330080 A1 * | 10/2024 | Abdelrahman ..... | H04L 63/1425 |
| 2024/0330927 A1 * | 10/2024 | Abdelrahman ........ | G06N 3/045 |
| 2024/0394705 A1 * | 11/2024 | Abdelrahman ...... | G06Q 20/389 |
| 2025/0103401 A1 * | 3/2025 | Singh ................. | G06F 11/3688 |

OTHER PUBLICATIONS

Hewa, et al.; Survey on Blockchain based Smart Contracts: Applications, Opportunities and Challenges Summary Cache: A Scaleable Wide-Area web Cache Sharing Protocol; Journal of Network and Computer Applications; Oct. 30, 2020; 55 pages.

(Continued)

*Primary Examiner* — Robert W Beausoliel, Jr.
*Assistant Examiner* — Lauren Zannah Ganger
(74) *Attorney, Agent, or Firm* — Banner & Witcoff, Ltd.

(57)          ABSTRACT

Aspects of the disclosure relate to using machine learning models to merge smart contracts. A computing system may receive a prompt to merge smart contracts. Based on inputting the prompt into a generative artificial intelligence model configured to parse prompts, smart contract data may be retrieved from a blockchain stored in a distributed ledger platform. Based on inputting the smart contract data into the generative artificial intelligence model, smart contract clusters may be generated. Based on at least one of the smart contract clusters meeting performance criteria, merged smart contracts that meet the performance criteria may be generated. Furthermore, one or more blocks comprising the merged smart contracts may be generated.

20 Claims, 7 Drawing Sheets

(56)           References Cited

OTHER PUBLICATIONS

Zheng, et al.; An Overview on Smart Contacts: Challenges, Advances and Platforms; retrived from the internet URL: https://www.sciencedirect.com/science/article/abs/pii/S0167739X19316280; Version of Record dated Dec. 23, 2019.

Christidis, et al. Blockchains and Smart Contracts for the Internet of Things; IEEEAccess; date od publication May 10, 2016.

* cited by examiner

100

600

700

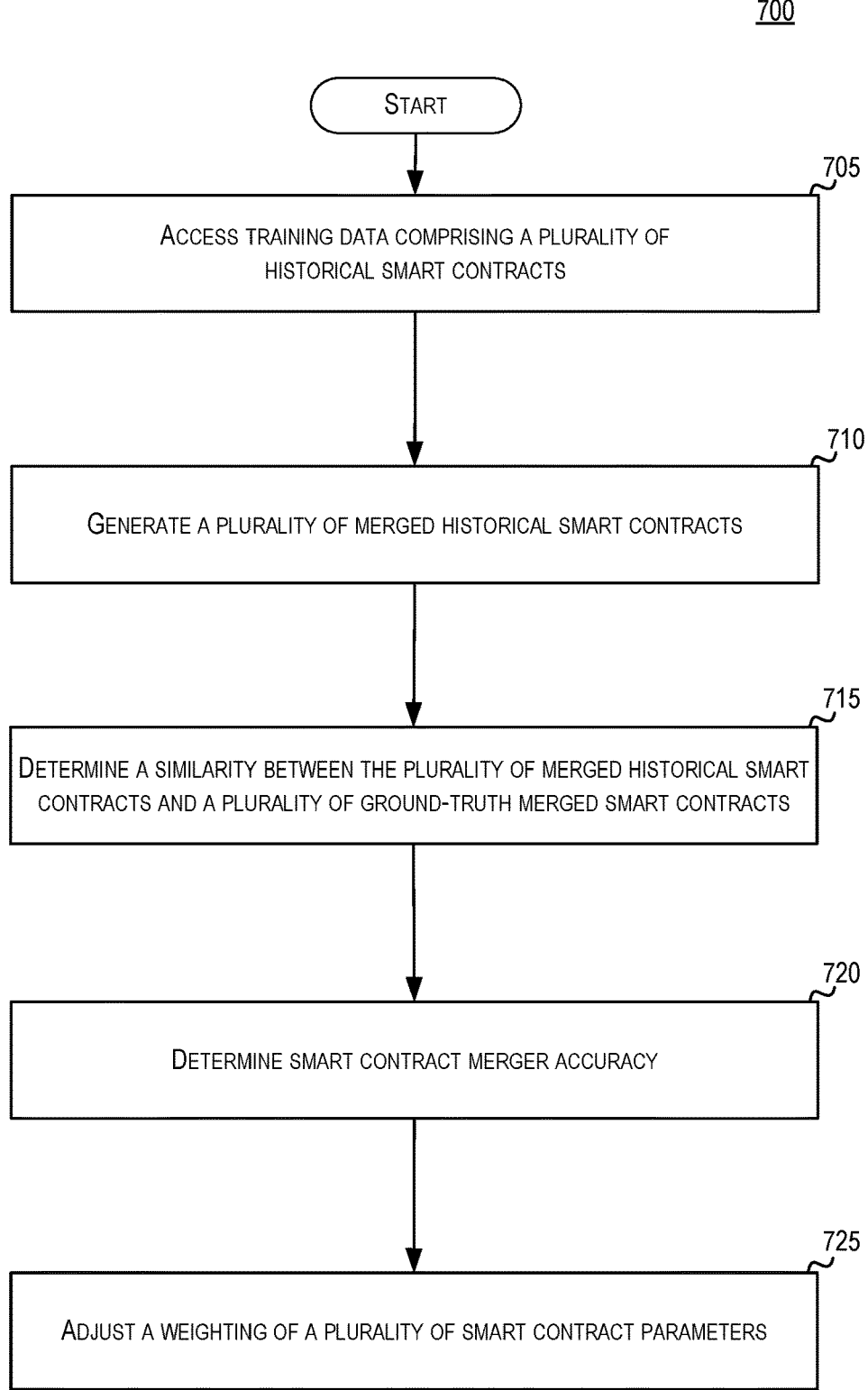

START

705
ACCESS TRAINING DATA COMPRISING A PLURALITY OF
HISTORICAL SMART CONTRACTS

710
GENERATE A PLURALITY OF MERGED HISTORICAL SMART CONTRACTS

715
DETERMINE A SIMILARITY BETWEEN THE PLURALITY OF MERGED HISTORICAL SMART
CONTRACTS AND A PLURALITY OF GROUND-TRUTH MERGED SMART CONTRACTS

720
DETERMINE SMART CONTRACT MERGER ACCURACY

725
ADJUST A WEIGHTING OF A PLURALITY OF SMART CONTRACT PARAMETERS

FIG. 7

INTELLIGENT METHOD TO COMBINE MULTIPLE BLOCKCHAIN BASED SMART CONTRACTS LEVERAGING GENERATIVE ARTIFICIAL INTELLIGENCE

TECHNICAL FIELD

Some aspects of the disclosure relate to using machine learning models to automatically merge smart contracts. In particular, some aspects of the disclosure pertain to process- ing smart contracts stored in a blockchain and using a generative artificial intelligence model to merge the smart contracts based on received prompts.

BACKGROUND

Smart contracts may be used for a variety of purposes including the performance of financial transactions. These financial transactions may vary and may comprise multiple steps, each of which may need to be performed in order to complete the transaction. In some cases a single smart contract may perform these steps, while in other cases, different steps may be performed by different smart con- tracts. Smart contracts may be stored in a blockchain, which in the case of proof-of-work system may use a significant amount of computational resources and energy. As a result, a greater number of smart contracts may result in a greater use of computational resources and energy.

Further, the task of attempting to optimize smart contracts may be time consuming and require significant amounts of computational resources as well as manual intervention on the part of a usually small group of individuals who are qualified to examine particular sets of smart contracts. Such manual intervention and use of computational resources may result in significant costs and use of time. As a result, attempting to optimize smart contracts may present chal- lenges.

SUMMARY

Aspects of the disclosure provide technical solutions to improve the effectiveness with which smart contracts may be processed and merged.

In accordance with one or more embodiments of the disclosure, a computing system for merging smart contracts may comprise: a distributed ledger system that may com- prise a blockchain. The blockchain may comprise one or more blocks comprising a plurality of smart contracts. The computing system may comprise one or more processors; and memory storing computer-readable instructions that, when executed by the one or more processors, cause the computing system to receive one or more prompts that may comprise a prompt to merge at least two smart contracts of the plurality of smart contracts. The computing system may retrieve, from the one or more blocks of the blockchain, based on inputting the one or more prompts into one or more generative artificial intelligence (Generative AI) models configured to parse the one or more prompts, smart contract data for the plurality of smart contracts. The computing system may generate, based on inputting the smart contract data into the one or more generative AI models, a plurality of smart contract clusters may comprise two or more of the plurality of smart contracts. The computing system may determine whether at least one of the plurality of smart contract clusters meets one or more performance criteria. The computing system may, based on at least one of the plurality of smart contract clusters meeting one or more performance criteria, generate, one or more merged smart contracts may comprise the at least one of the plurality of smart contract clusters that meet the one or more perfor- mance criteria. The computing system may generate, one or more blocks of the blockchain. Each of the blocks of the blockchain may comprise at least one of the one or more merged smart contracts.

In one or more implementations, the memory may store additional computer-readable instructions to generate the plurality of smart contract clusters that, when executed by the one or more processors, further cause the computing system to generate a plurality of abstract syntax trees (ASTs) corresponding to the plurality of smart contracts; and deter- mine the plurality of smart contract clusters based on one or more similarities between the plurality of ASTs correspond- ing to the plurality of smart contracts.

In one or more implementations, the memory may store additional computer-readable instructions to determine whether at least one of the plurality of smart contract clusters meets one or more performance criteria that, when executed by the one or more processors, further cause the computing system to: generate a plurality of confidence values corre- sponding to the plurality of smart contract clusters; and determine the one or more merged smart contracts based on the plurality of smart contract clusters corresponding to the plurality of confidence values that exceed a confidence value threshold.

In one or more implementations, the memory may store additional computer-readable instructions that, when executed by the one or more processors, further cause the computing system to access smart contract training data may comprise a plurality of historical smart contracts. The com- puting system may generate, based on inputting the smart contract training data into the one or more generative AI models, a plurality of merged historical smart contracts. The computing system may determine a similarity between the plurality of merged historical smart contracts and a plurality of ground-truth merged smart contracts. The computing system may generate, based on the similarity between the plurality of merged historical smart contracts and the plu- rality of ground-truth merged smart contracts, a smart con- tract merger accuracy of the one or more generative AI models. The computing system may modify a weighting of a plurality of smart contract parameters of the one or more generative AI models based on the smart contract merger accuracy The weighting of the plurality of smart contract parameters that increase the smart contract merger accuracy may be increased. The weighting of the plurality of smart contract parameters that decrease the smart contract merger accuracy may be decreased.

In one or more implementations, the smart contract merger accuracy may be based on an amount of similarity between the plurality of merged historical smart contracts and the plurality of ground-truth merged smart contracts.

In one or more implementations, the one or more gen- erative AI models are configured to generate the smart contract data extraction criteria based on performance of natural language processing operations on the one or more prompts.

In one or more implementations, the one or more perfor- mance criteria may comprise one or more interoperability criteria. Meeting one or more interoperability criteria may comprise determining that the two or more of the plurality of smart contracts in each of the plurality of smart contract clusters are interoperable.

In one or more implementations, the one or more perfor- mance criteria may comprise one or more error rate criteria.

Meeting one or more error rate criteria may comprise determining that an error rate of the two or more of the plurality of smart contracts in each of the plurality of smart contract clusters does not exceed an error rate threshold.

In one or more implementations, the one or more performance criteria may comprise one or more response time criteria. Meeting one or more response time criteria may comprise determining that a response time of the two or more of the plurality of smart contracts in each of the plurality of smart contract clusters does not exceed a response time threshold.

In one or more implementations, the one or more performance criteria may comprise one or more throughput criteria. Meeting one or more throughput criteria may comprise determining that a throughput of the two or more of the plurality of smart contracts in each of the plurality of smart contract clusters exceeds a throughput threshold.

In one or more implementations, the one or more performance criteria may comprise one or more gas consumption criteria. Meeting one or more gas consumption criteria may comprise determining that a gas consumption of the two or more of the plurality of smart contracts in each of the plurality of smart contract clusters does not exceed a gas consumption threshold.

In one or more implementations, the one or more performance criteria may comprise one or more block confirmation time criteria. Meeting one or more block confirmation time criteria may comprise determining that a block confirmation time of the two or more of the plurality of smart contracts in each of the plurality of smart contract clusters does not exceed a block confirmation time threshold.

In one or more implementations, the smart contract data for each of the plurality of smart contracts may comprise a smart contact name, a smart contract version, a smart contract author, a smart contract compiler environment, smart contract source code, an application binary interface (ABI), a compiler setting, or a smart contract date of creation.

In one or more implementations, the smart contract data may comprise one or more links between the plurality of smart contracts that are dependent on at least one other smart contract of the plurality of smart contracts. Further, the one or more merged smart contracts may comprise the one or more links.

Corresponding methods (e.g., computer-implemented methods), apparatuses, devices, systems, and/or computer-readable media (e.g., non-transitory computer readable media) are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 7 depicts an illustrative method for automatically training a machine learning model to merge smart contracts in accordance with one or more aspects of the disclosure.

DETAILED DESCRIPTION

Figure 1:
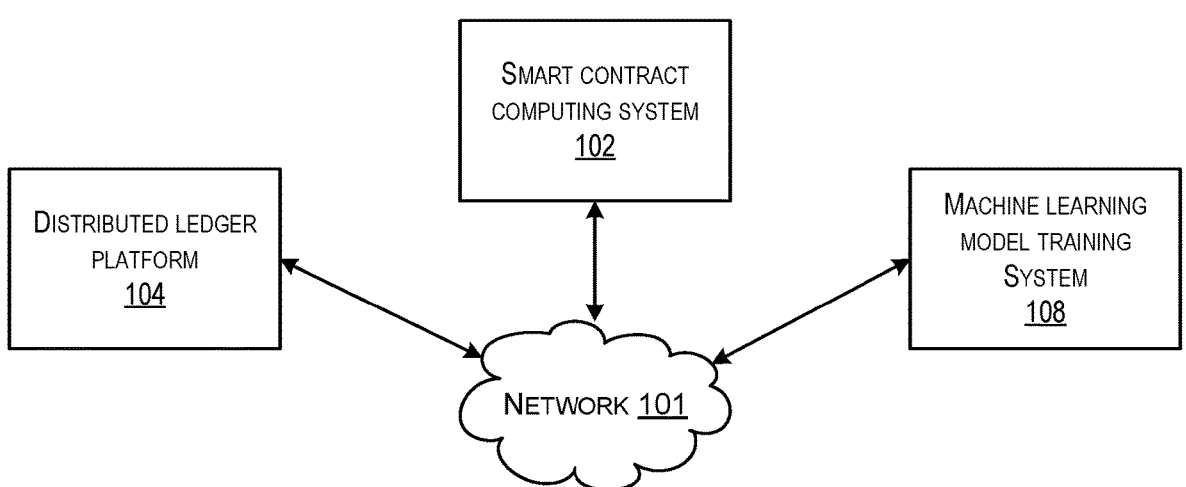
FIG. 1 depicts an illustrative computing environment for automated merging of smart contracts in accordance with one or more aspects of the disclosure.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosed technology may relate to devices, systems, non-transitory computer readable media, and/or methods for combining multiple blockchain based smart contracts. Smart contracts may comprise self-executing contracts that are stored on a blockchain. The smart contract may automatically enforce a set of rules defined in the contract (e.g., terms and conditions of the contract), thereby allowing parties to engage in transactions without having an intermediary between the parties. The disclosed technology may leverage the use of artificial intelligence (e.g., machine learning models) to analyze smart contracts and generate smart contract clusters comprising two or more of the smart contracts, thereby reducing redundancy in the smart contracts.

Smart contracts may be generated based on the requirements of parties at the time the smart contracts were generated. Some parties may form multiple smart contracts that are the same, similar, or may comprise terms and/or conditions that match. Further, some smart contracts may be dependent on other smart contracts. The process of sorting through existing smart contracts in order to reduce redundancy and other may be a complex task that requires significant use of time and resources. To reduce the time and resources used to more effectively combine and arrange smart contracts, the disclosed technology may provide an artificial intelligence (e.g., machine learning model) algorithm based computing platform that is uniquely configured to analyze a blockchain comprising smart contracts and more effectively merge the smart contracts.

Additionally, the disclosed technology may analyze the smart contracts and generate merged smart contracts based on an estimated performance of the smart contract clusters. Further, the disclosed computing technology may comprise a user friendly interface through which a user may provide prompts that may be used to analyze a blockchain and generate merged smart contracts that meet the user's requirements.

For example, a computing system may receive prompts to merge smart contracts. The prompts may indicate specific contracts or may be more open ended. For example, the prompts may indicate that indicate the types of smart contracts to merge or the parties that are party to the smart contracts. The prompts may be inputted into a machine learning model (e.g., a generative pretrained transformer (GPT) model) that is implemented on the computing system. The computing system may be configured to access and/or retrieve smart contract information (e.g., smart contract data) from a blockchain based on the one or more prompts. The smart contract data accessed by the computing system may indicate dependencies between one or more smart contracts stored in the blockchain. For example, the smart contract data may indicate a smart contract name, a version of the smart contract, an author of a smart contract, a compiler environment, source code, and application binary interface, a compiler setting, dependent smart contracts, a smart contract data of creation, a blockchain network identifier, a time range within which a smart contract is valid, parties that are authorized to access a smart contract, and/or a gas consumption associated with a smart contract. The machine learning model may analyze the smart contracts on the blockchain and estimate performance of smart contract clusters based on the plurality of smart contracts in the blockchain. The computing system may use an abstract syntax tree to analyze the smart contract data and/or generate the smart contract clusters. The computing system may then generate smart contract clusters based on the estimated performance of smart contract clusters that meet some performance criteria. The use of these techniques may result in a variety of benefits and advantages including improving the efficiency with which computational resources and network resources are used.

FIG. 1 depicts an illustrative computing environment for automated merging of smart contracts in accordance with one or more aspects of the disclosure. Referring to FIG. 1, computing environment 100 may include one or more computing systems. For example, computing environment 100 may include smart contract computing system 102, distributed ledger platform 104, and/or machine learning model training system 108.

As described further below, smart contract computing system 102 may comprise a computing system that includes one or more computing devices (e.g., computing devices comprising one or more processors, one or more memory devices, one or more storage devices, and/or communication interfaces) that may be used to process and/or merge smart contracts that may be stored on a blockchain. For example, the smart contract computing system 102 may be configured to implement one or more machine learning models that may be configured and/or trained to generate smart contract data extraction criteria based on prompts, retrieve smart contract data, generate smart contract clusters, generate merged smart contracts, and/or generate blocks of a blockchain in which the blocks comprise the merged smart contracts.

In some implementations, the smart contract computing system 102 may transmit data (e.g., a request to access a blockchain) that may be used to access information (e.g., smart contract data) associated with the distributed ledger platform 104, and/or the machine learning model training system 108. The data transmitted by the smart contract computing system 102 may be transmitted to distributed ledger platform 104, and/or machine learning model training system 108. Distributed ledger platform 104 may be configured to grant access to the smart contract computing system 102. For example, authorization to access a blockchain stored on the distributed ledger platform 104 may be restricted to authorized users of the smart contract computing system 102 and/or the distributed ledger platform 104 (e.g., an administrator with permission to access a blockchain stored on distributed ledger platform 104).

Communication between the smart contract computing system 102, distributed ledger platform 104, and/or the machine learning model training system 108 may be encrypted. In some embodiments, the smart contract computing system 102 may access one or more computing devices and/or computing systems remotely. For example, the smart contract computing system 102 may remotely access the distributed ledger platform 104, and/or the machine learning model training system 108.

Each of the one or more computing devices and/or one or more computing systems described herein may comprise one or more processors, one or more memory devices, one or more storage devices (e.g., one or more solid state drives (SSDs), one or more hard disk drives (HDDs), and/or one or more hybrid drives that incorporate SSDs, HDDs, and/or RAM), and/or a communication interface that may be used to send and/or receive data and/or perform operations including determining whether to grant access to a blockchain stored on distributed ledger platform 104. For example, the smart contract computing system 102 may process a plurality of smart contracts that may be used to generate one or more merged smart contracts.

Machine learning model training system 108 may comprise a computing system that includes one or more computing devices (e.g., servers, server blades, and/or the like) and/or other computer components (e.g., one or more processors, one or more memory devices, and/or one or more communication interfaces) that may be used to store training data that may be used to train one or more machine learning models. For example, the machine learning model training system 108 may store training data comprising one or more training instructions for the generation of smart contract clusters and/or merged smart contracts. One or more machine learning models stored and/or trained on the machine learning model training system 108 may include the one or more machine learning models on the smart contract computing system 102. Further, the one or more machine learning models of the smart contract computing system 102 may be trained and/or updated by the machine learning model training system 108.

Distributed ledger platform 104 may comprise a computing device and/or computing system that includes one or more computing devices (e.g., servers, server blades, or the like) and/or other computer components (e.g., processors, memories, communication interfaces) that may be used to generate, host, and/or otherwise maintain a distributed ledger (e.g., a blockchain, holochain, and/or other distributed ledger). In some implementations, the distributed ledger platform 104 may communicate with the smart contract computing system 102, which may generate and/or add blocks to a blockchain stored on distributed ledger platform 104. Further, distributed ledger platform 104 may access blocks and/or blockchains stored on the distributed ledger platform 104. For example, the smart contract computing system 102 may generate a block comprising a merged smart contract.

Computing environment 100 may include one or more networks, which may interconnect the smart contract computing system 102, distributed ledger platform 104, and/or machine learning model training system 108. For example, computing environment 100 may include a network 101 which may interconnect, e.g., smart contract computing system 102, distributed ledger platform 104, machine learning model training system 108. In some instances, the network 101 may be a 5G data network, and/or other data network.

In one or more arrangements, smart contract computing system 102, distributed ledger platform 104, and/or machine learning model training system 108 may comprise one or more computing devices capable of sending and/or receiving data (e.g., smart contract data) and processing the data accordingly. For example, smart contract computing system 102, distributed ledger platform 104, machine learning model training system 108 and/or the other systems included in computing environment 100 may, in some instances, include server computers, desktop computers, laptop computers, tablet computers, smart phones, or the like that may include one or more processors, one or more memory devices, communication interfaces, one or more storage devices, and/or other components.

Further, any combination of smart contract computing system 102, distributed ledger platform 104, and/or machine learning model training system 108 may, in some instances, be special-purpose computing devices configured to perform specific functions. For example, smart contract computing system 102 may comprise one or more application specific integrated circuits (ASICs) that are configured to generate smart contract data extraction criteria based on prompts, retrieve smart contract data, generate smart contract clusters, generate merged smart contracts, and/or generate blocks of a blockchain in which the blocks comprise the merged smart contracts.

Figure 2:
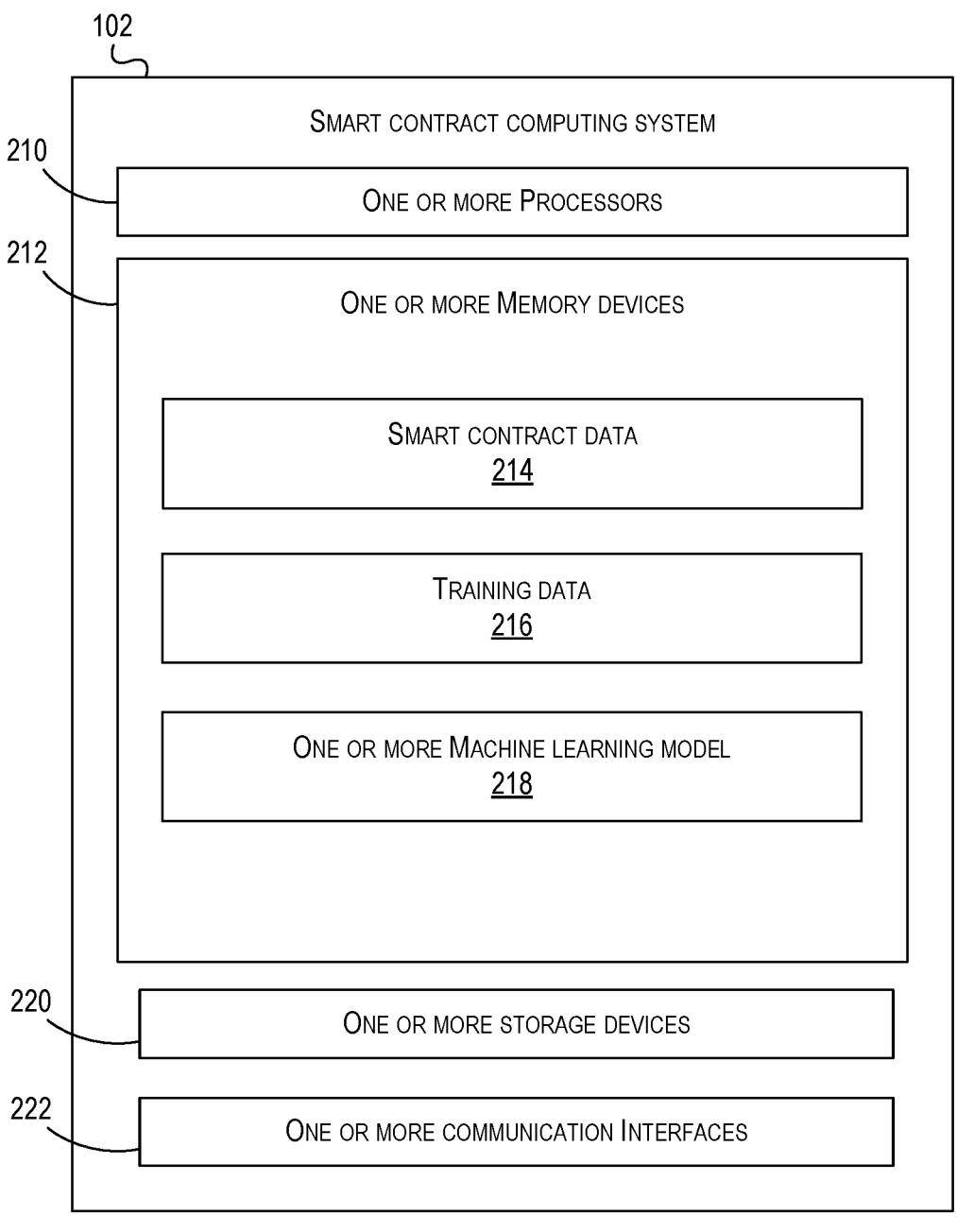
FIG. 2 depicts an illustrative computing system for automated merging of smart contracts in accordance with one or more aspects of the disclosure.

FIG. 2 depicts an illustrative computing system for automated merging of smart contracts in accordance with one or more aspects of the disclosure. Smart contract computing system 102 may include one or more processors (e.g., processor 210), one or more memory devices 212, and a communication interface (e.g., one or more communication interfaces 222). A data bus may interconnect the processor 210, one or more memory devices 212, one or more storage devices 220, and/or one or more communication interfaces 222. One or more communication interfaces 222 may be configured to support communication between smart contract computing system 102 and one or more networks (e.g., network 101, or the like). One or more communication interfaces 222 may be communicatively coupled to the one or more processor 210. The memory may include one or more program modules having instructions that when executed by one or more processor 210 may cause the smart contract computing system 102 to perform one or more functions described herein and/or access data that may store and/or otherwise maintain information which may be used by such program modules and/or one or more processors 210.

The one or more memory devices 212 may comprise RAM. In some instances, the one or more program modules and/or databases may be stored by and/or maintained in different memory units of smart contract computing system 102 and/or by different computing devices that may form and/or otherwise make up smart contract computing system 102. For example, the memory may have, host, store, and/or include smart contract data 214, training data 216, and/or one or more machine learning models 218. One or more storage devices 220 (e.g., solid state drives and/or hard disk drives) may also be used to store data including the smart contract data 214. The one or more storage devices 220 may comprise non-transitory computer readable media that may store data when the one or more storage devices 220 are in an active state (e.g., powered on) or an inactive state (e.g., sleeping or powered off).

Smart contract data Smart contract data 214 may comprise data associated with a smart contract. The smart contract data 214 may comprise a smart contact name, a smart contract version, a smart contract author, a smart contract compiler environment, smart contract source code, an application binary interface (ABI), a compiler setting, and/or a smart contract date of creation.

Training data 216 may comprise a plurality of historical smart contracts. Training data 216 may be used to train one or more machine learning models (e.g., machine learning models 218). Further, training data 216 may be modified (e.g., some historical data may be added, deleted, and/or changed) over time. For example, new historical smart contract data may be used to update the training data 216. Further, the training data may be periodically updated after new merged smart contracts are generated.

One or more machine learning models 218 may implement, refine, train, maintain, and/or otherwise host an artificial intelligence model that may be used to process, analyze, evaluate, and/or generate data. For example, the one or more machine learning models 218 may process, analyze, and/or evaluate smart contract data 214 smart contract extraction criteria. Further, the one or more machine learning models 218 may generate output including a merged smart contract that may be selected from a plurality of smart contract clusters. For example, a merged smart contract may comprise a smart contract cluster that corresponds to a highest confidence value. Further, one or more machine learning models 218 may comprise one or more instructions that direct and/or cause the smart contract computing system 102 to access the smart contract data 214, and/or perform other functions. Further, one or more machine learning models 218 may comprise a machine learning model that comprises one or more instructions to generate smart contract extraction criteria based on prompts as described herein.

Figure 3:
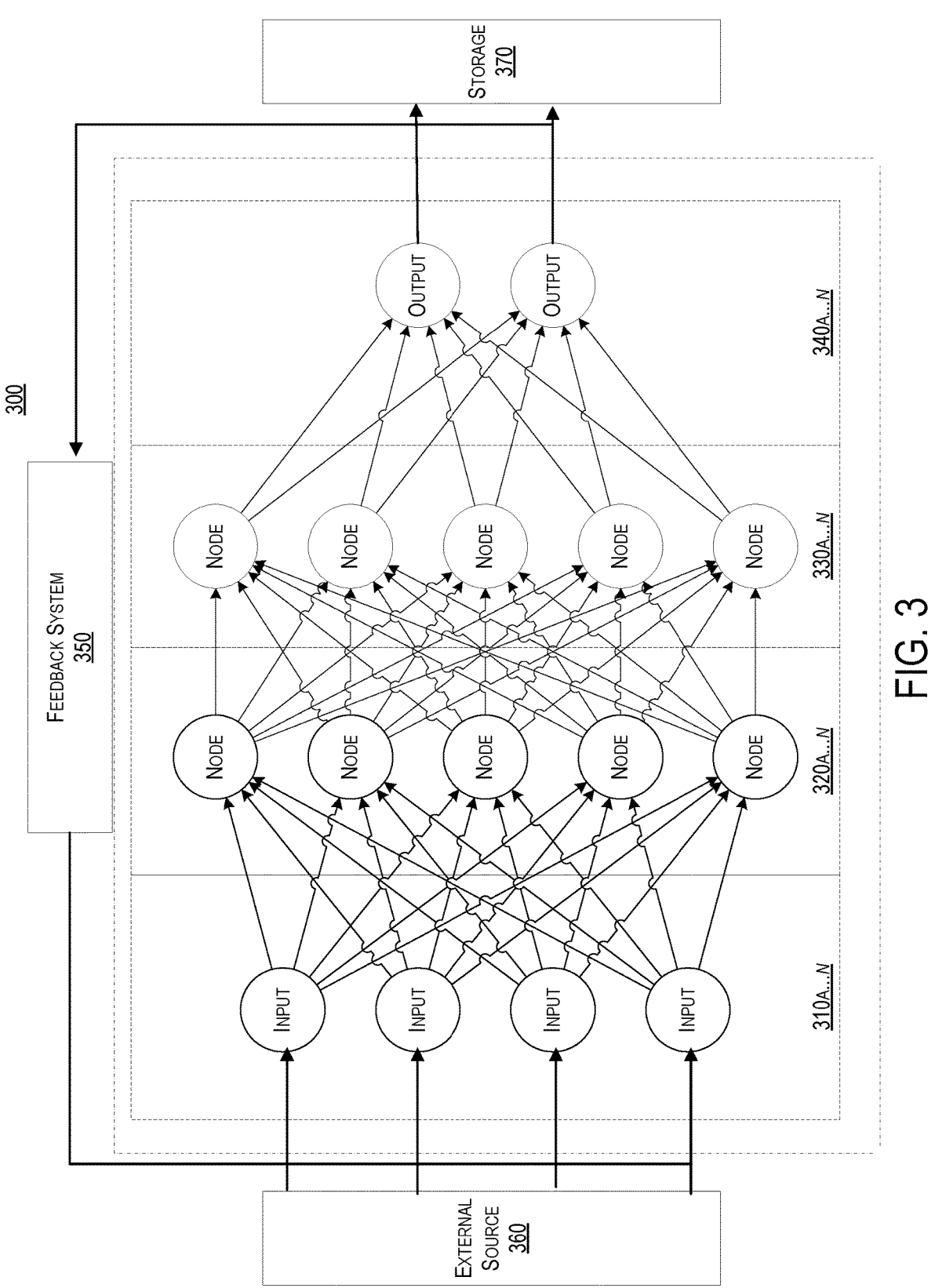
FIG. 3 depicts nodes of an illustrative artificial neural network on which a machine learning algorithm may be implemented in accordance with one or more aspects of the disclosure.

FIG. 3 depicts nodes of an illustrative artificial neural network on which a machine learning algorithm may be implemented in accordance with one or more aspects of the disclosure. In FIG. 3, each of input nodes 310*a-n* may be connected to a first set of processing nodes 320*a-n*. Each of the first set of processing nodes 320*a-n* may be connected to each of a second set of processing nodes 330*a-n*. Each of the second set of processing nodes 330*a-n* may be connected to each of output nodes 340*a-n*. Though only two sets of processing nodes are shown, any number of processing nodes may be implemented. Similarly, though only four input nodes, five processing nodes, and two output nodes per set are shown in FIG. 3, any number of nodes may be implemented per set. Data flows in FIG. 3 are depicted from left to right: data may be input into an input node, may flow through one or more processing nodes, and may be output by an output node. Input into the input nodes 310*a-n* may originate from an external source 360. Output may be sent to a feedback system 350 and/or to storage 370. The feedback system 350 may send output to the input nodes 310*a-n* for successive processing iterations with the same or different input data.

In one illustrative method using feedback system 350, the system may use machine learning to determine an output. The output may include regression output, confidence values, and/or classification output. For example, the output may include a plurality of smart contract clusters which may comprise one or more merged smart contracts that meet one or more performance criteria. The system may use any machine learning model including one or more generative pretrained transformers (GPTs), XGBoosted decision trees, auto-encoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially. In one example, optimization comprises minimizing the number of false positives to maximize accuracy. Alternatively, an optimization function may minimize the number of missed positives to optimize minimization of losses.

In one example, FIG. 3 depicts nodes that may perform various types of processing, such as discrete computations, computer programs, and/or mathematical functions implemented by a computing device. For example, the input nodes 310*a-n* may comprise logical inputs of different data sources, such as one or more data servers. The processing nodes 320*a-n* may comprise parallel processes executing on multiple servers in a data center. And, the output nodes 340*a-n* may be the logical outputs that ultimately are stored in results data stores, such as the same or different data servers as for the input nodes 310*a-n*. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 300 may learn and/or be dynamically reconfigured. Though nodes are depicted as having connections only to successive nodes in FIG. 3, connections may be formed between any nodes. For example, one processing node may be configured to send output to a previous processing node.

Input received in the input nodes 310*a-n* may be processed through processing nodes, such as the first set of processing nodes 320*a-n* and the second set of processing nodes 330*a-n*. The processing may result in output in output nodes 340*a-n*. As depicted by the connections from the first set of processing nodes 320*a-n* and the second set of processing nodes 330*a-n*, processing may comprise multiple steps or sequences. For example, the first set of processing nodes 320*a-n* may be a rough data filter, whereas the second set of processing nodes 330*a-n* may be a more detailed data filter.

The artificial neural network 300 may be configured to effectuate decision-making. As a simplified example for the purposes of explanation, the artificial neural network 300 may be configured to generate data (e.g., one or more smart contract extraction criteria, a plurality of smart contract clusters, and/or one or more merged smart contracts) and/or instructions (e.g., instructions to merge smart contracts). The input nodes 310*a-n* may be provided with one or more prompts, one or more smart contract extraction criteria, and/or smart contract data. The first set of processing nodes 320*a-n* may be each configured to perform specific steps to analyze the one or more smart contract extraction criteria and/or smart contract data, such as determining the throughput, error rate, gas consumption, block confirmation time, response time, and/or interoperability of smart contracts. The second set of processing nodes 330*a-n* may be each configured to determine the performance of merged smart contracts that may be generated based on the smart contract clusters. Multiple subsequent sets may further refine this processing, each looking for further more specific tasks, with each node performing some form of processing which need not necessarily operate in the furtherance of that task. The artificial neural network 300 may then execute or cause to be executed operations that generate one or more merged smart contracts.

The feedback system 350 may be configured to determine the accuracy of the artificial neural network 300. Feedback may comprise an indication of similarity between the value of an output generated by the artificial neural network 300 and a ground-truth value. For example, in the merged smart contract generation example provided above, the feedback system 350 may be configured to determine the plurality of smart contract clusters that meet one or more criteria (e.g., one or more performance criteria) and may include the selection of one or more merged smart contracts that optimally meet the one or more performance criteria.

The feedback system 350 may already have access to the ground-truth data (e.g., an optimized merged smart contract), such that the feedback system may train the artificial neural network 300 by indicating the accuracy of the output generated by the artificial neural network 300. The feedback system 350 may comprise human input, such as an administrator indicating to the artificial neural network 300 whether it made a correct decision. The feedback system may provide feedback (e.g., an indication of whether the previous output was correct or incorrect and/or an extent to which the merged smart contracts are similar to the ground-truth merged smart contracts) to the artificial neural network 300 via input nodes 310a-n or may transmit such information to one or more nodes. The feedback system 350 may additionally or alternatively be coupled to the storage 370 such that output is stored. The feedback system may not have correct answers at all, but instead base feedback on further processing: for example, the feedback system may comprise a system programmed to analyze and/or validate smart contract data, such that the feedback allows the artificial neural network 300 to compare its results to that of a manually programmed system.

The artificial neural network 300 may be dynamically modified to learn and provide better input. Based on, for example, previous input and output and feedback from the feedback system 350, the artificial neural network 300 may modify itself. For example, processing in nodes may change and/or connections may be weighted differently. Additionally or alternatively, the node may be reconfigured to process smart contract data differently. The modifications may be predictions and/or guesses by the artificial neural network 300, such that the artificial neural network 300 may vary its nodes and connections to test hypotheses.

The artificial neural network 300 need not have a set number of processing nodes or number of sets of processing nodes, but may increase or decrease its complexity. For example, the artificial neural network 300 may determine that one or more processing nodes are unnecessary or should be repurposed, and either discard or reconfigure the processing nodes on that basis. As another example, the artificial neural network 300 may determine that further processing of all or part of the input is required and add additional processing nodes and/or sets of processing nodes on that basis.

The feedback provided by the feedback system 350 may be mere reinforcement (e.g., providing an indication that output is correct or incorrect, awarding the machine learning algorithm a number of points, or the like) or may be specific (e.g., providing the correct output). The artificial neural network 300 may be supported or replaced by other forms of machine learning. For example, one or more of the nodes of artificial neural network 300 may implement a decision tree, associational rule set, logic programming, regression model, cluster analysis mechanisms, Bayesian network, propositional formulae, generative models, and/or other algorithms or forms of decision-making. The artificial neural network 300 may effectuate deep learning. In some implementations, the artificial neural network 300 may receive input including one or more input features. The one or more input features may comprise information associated with a number and/or type of smart contracts.

Figure 4:
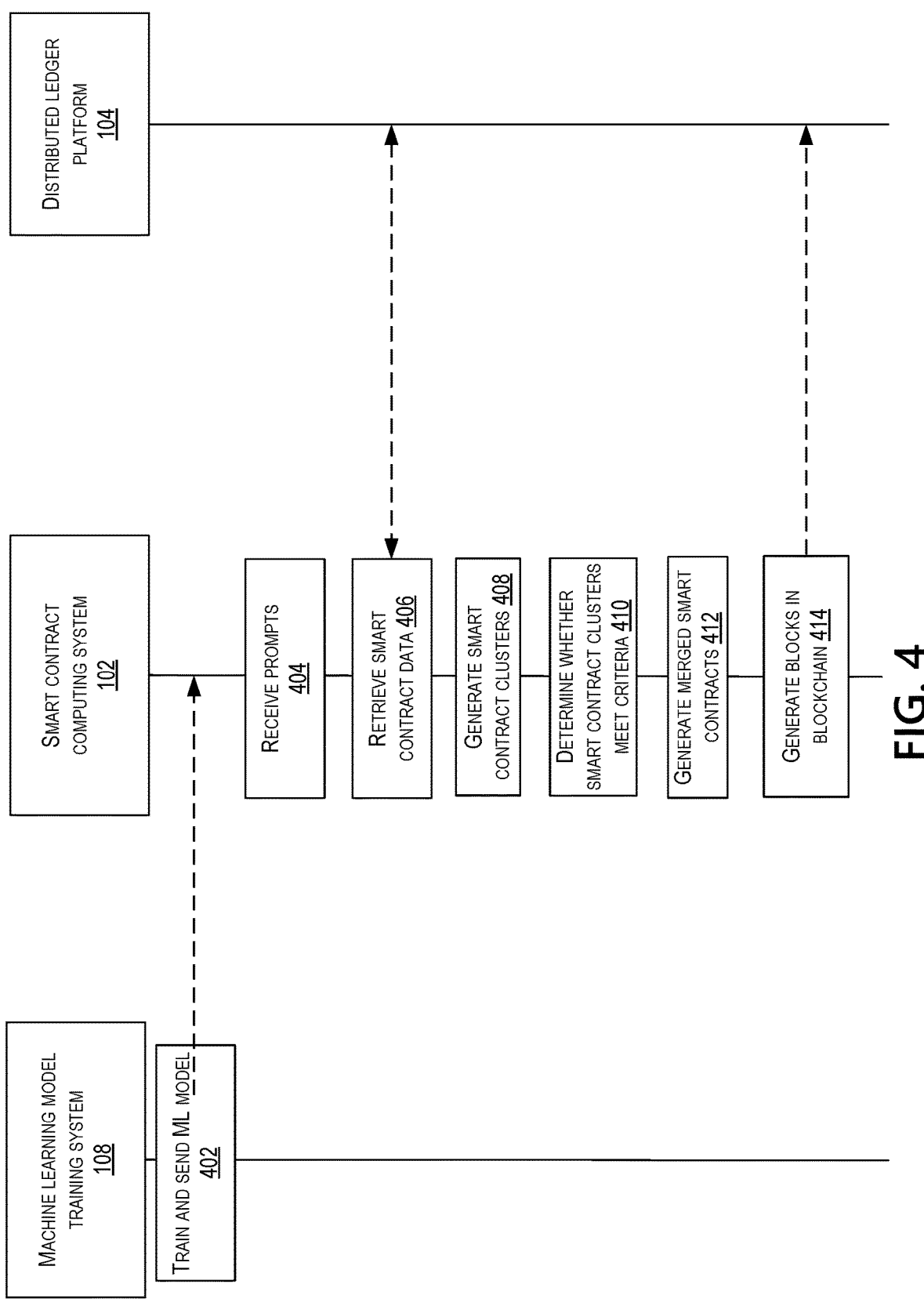
FIG. 4 depicts an illustrative event sequence for automated merging of smart contracts in accordance with one or more aspects of the disclosure.

FIG. 4 depicts an illustrative event sequence for automated merging of smart contracts in accordance with one or more aspects of the disclosure. Referring to FIG. 4, at step 402, a machine learning model training system 108 may train one or more machine learning models (e.g., one or more generative artificial intelligence models that may comprise a natural language processing model) to parse one or more prompts and generate one or more merged smart contracts. The machine learning model training system may then send the one or more trained machine learning models to smart contract computing system 102 which may implement the one or more trained machine learning models (e.g., implement the one or more generative AI models).

In some embodiments, smart contract computing system 102 may periodically establish a data connection with the machine learning model training system 108 in order to receive up to date copies of one or more machine learning models (e.g., the one or more machine learning models 218 described with respect to FIG. 2 and/or the artificial neural network 300 that is described with respect to FIG. 3) that may be used to parse one or more prompts and generate one or more merged smart contracts as described herein. In some instances, the machine learning model training system 108 may determine whether the smart contract computing system 102 has an updated copy of the one or more machine learning models and may send an indication to the smart contract computing system 102 if an update is not warranted at that time.

At step 404, the smart contract computing system 102 may receive one or more prompts to merge a plurality of smart contracts. For example, a user may input, into one or more machine learning models, text based prompts to merge smart contracts in a blockchain specified by the user. The smart contract computing system 102 may generate At step 406, the smart contract computing system 102 may, based on the one or more prompts that were inputted into the one or more machine learning models, retrieve smart contract data from one or more blocks of a blockchain stored in the distributed ledger platform 104. In some embodiments, the smart contract data may be stored locally and retrieved from the smart contract computing system 102. Retrieval of the smart contract data from the distributed ledger platform 104 may be based on a request to access and retrieve data (e.g., smart contract data) from the distributed ledger platform 104.

At step 408, the smart contract computing system 102 may input the smart contract data into the one or more machine learning models (e.g., one or more generative AI models), which may generate a plurality of smart contract clusters as described herein. Each of the smart contract clusters may comprise two or more of the plurality of smart contracts.

At step 410, the smart contract computing system 102 may determine whether at least one of the plurality of smart contract clusters meets one or more performance criteria. The determination of whether at least one of the plurality of smart contract clusters meets one or more performance criteria may be made by the one or more machine learning models described with respect to step 408.

At step 412, the smart contract computing system 102 may generate one or more merged smart contracts. Each of the one or more merged smart contracts may comprise two or more of the plurality of smart contracts and may comprise the smart contract clusters that meet the one or more performance criteria.

At step 414, the smart contract computing system 102 may generate one or more blocks that may be added to a blockchain stored on distributed ledger platform 104. Each of the one or more blocks may comprise the one or more merged smart contracts. In some embodiments, the blockchain may be encrypted and keys to decrypt blocks of the blockchain may be distributed to authorized entities.

Figure 5:
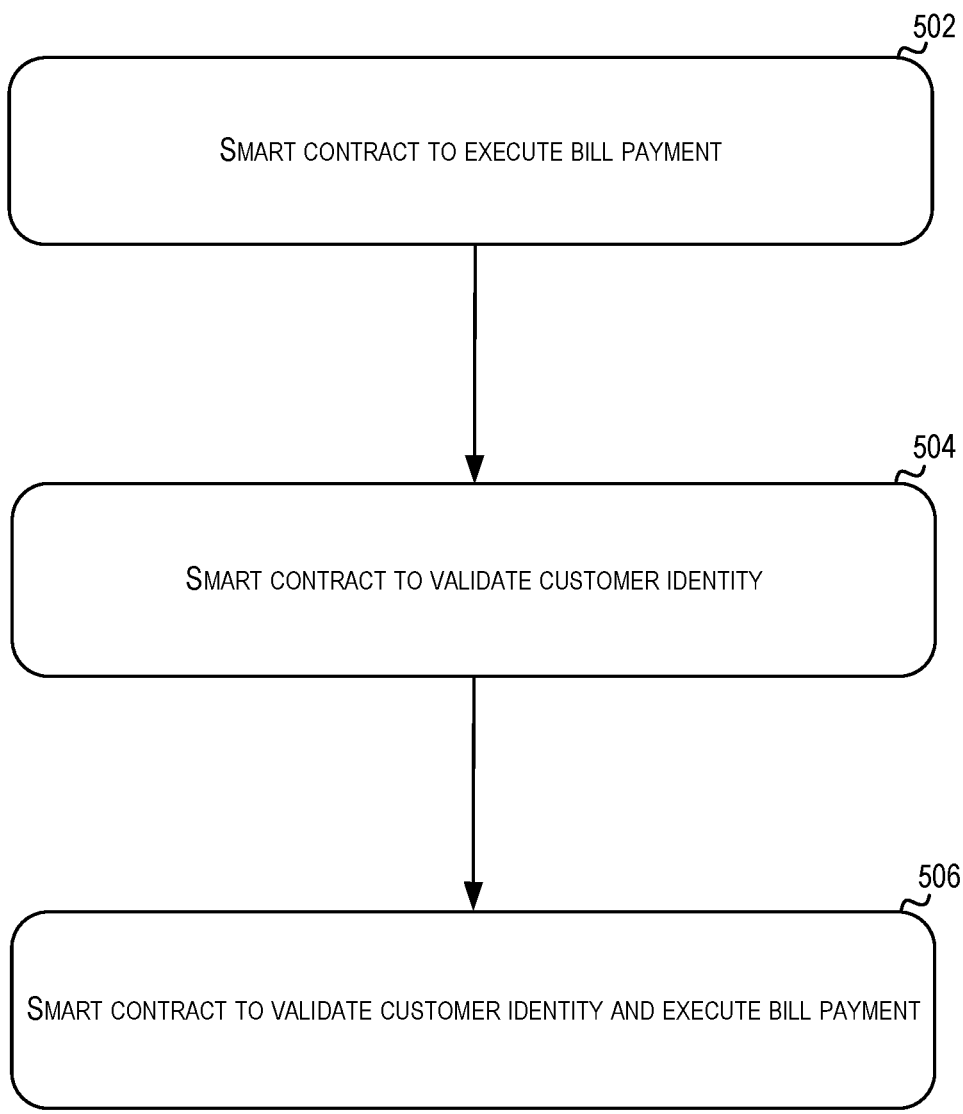
FIG. 5 depicts an illustrative example of merging smart contracts in accordance with one or more aspects of the disclosure.

FIG. 5 depicts an illustrative example of merging smart contracts in accordance with one or more aspects of the disclosure. The operations to merge smart contracts may be implemented by a computing device or computing system (e.g., the smart contract computing system 102) in accordance with the computing devices and/or computing systems described herein.

The first smart contract 502 may comprise instructions to execute a bill payment. For example, the first smart contract may be configured to automatically process a payment transaction from a customer that has provided payment for a service. The second smart contract 504 may comprise instructions to validate a customer's identity. For example, the second smart contract 504 may be configured to receive a user name and password and determine whether the customer that corresponds to the user name and password. Validation of the user's identity may be used to validate that a transaction (e.g., bill payment) is being performed by the correct customer.

As described herein, the first smart contract 502 and the second smart contract 504 may be merged into the merged smart contract 506 based on prompts that may cause smart contract data associated with the first smart contract 502 and the second smart contract 504 to be inputted into one or more machine learning models (e.g., one or more generative AI models) that may generate the merged smart contract 506. The merged smart contract 506 may comprise portions of the first smart contract 502 and the second smart contract 504. For example, the merged smart contract 506 may comprise instructions to validate a customer's identify and execute a bill payment. The merged smart contract 506 may execute instructions of the second smart contract 504 before executing instructions of the first smart contract 502.

The determination of the order in which to execute the instructions of the merged smart contract 506 may be based on analysis of the inputs and/or outputs of the first smart contract 502 and the second smart contract 504. For example, the one or more machine learning models may determine that the outputs of the first smart contract 502 may be provided as inputs to the second smart contract 504. As a result, the merged smart contract 506 may execute the instructions of the second smart contract 504 before executing the instructions of the first smart contract 502.

Figure 6:
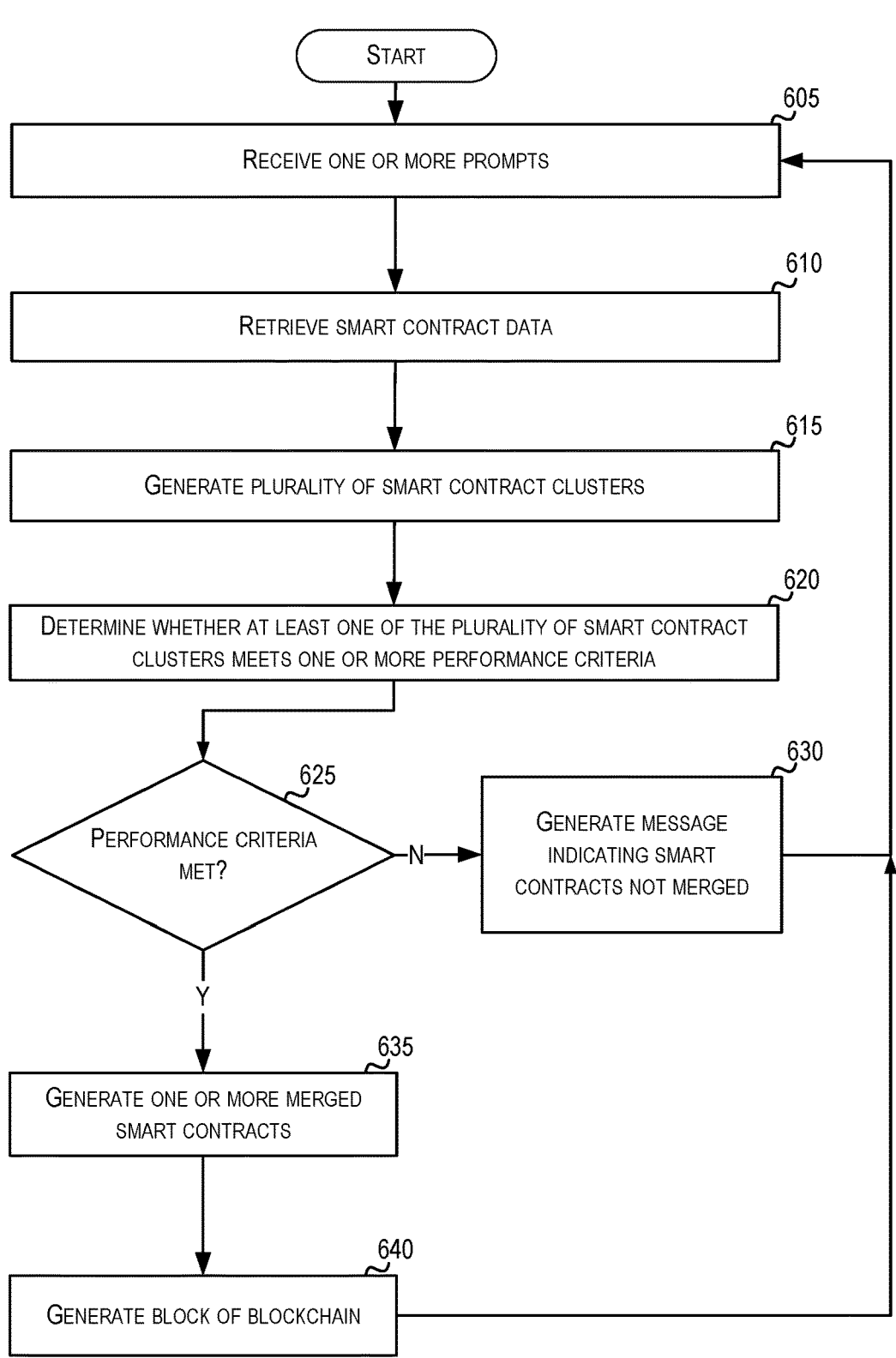
FIG. 6 depicts an illustrative method for automatically merging smart contracts in accordance with one or more aspects of the disclosure.

FIG. 6 depicts an illustrative method for automatically merging smart contracts in accordance with one or more aspects of the disclosure. The steps of a method 600 for automatically merging smart contracts may be implemented by a computing device or computing system (e.g., the smart contract computing system 102) in accordance with the computing devices and/or computing systems described herein. One or more of the steps described with respect to FIG. 6 may be omitted, performed in a different order, and/or modified. Further, one or more other steps (e.g., the steps described with respect to FIG. 7) may be added to the steps described with respect to FIG. 6.

At step 605, a computing system may receive one or more prompts. The one or more prompts may comprise one or more prompts to merge at least two smart contracts of the plurality of smart contracts. For example, a user interface of the smart contract computing system 102 may be configured to receive one or more inputs comprising text based prompts and/or voice based prompts to merge at least two smart contracts. The one or more prompts may for example comprise a prompt identifying one or more blockchains in which the plurality of smart contracts to merge are stored.

Further, the one or more prompts may comprise a number of smart contracts to include in a merged smart contract and/or types of smart contracts (e.g., types of transactions executed by the smart contracts) to include in a merged smart contract. For example, a user may specify that the merged smart contracts may be based on smart contracts for a specified department of an organization and/or that the merged smart contracts may not comprise more than a predetermined number of smart contracts (e.g., three smart contracts).

At step 610, a computing system may retrieve smart contract data of the plurality of smart contracts. The smart contract data may be retrieved from one or more blocks of a blockchain (e.g., a blockchain stored on a distributed ledger system). Further, retrieving the smart contract data may be based on inputting the one or more prompts into one or more generative artificial intelligence (Generative AI) models configured to parse the one or more prompts. For example, the one or more prompts may comprise a prompt to "MERGE SMART CONTRACTS RELATED TO CUSTOMER BILL PAYMENTS" which may be inputted into the one or more generative AI models. The one or more generative AI models may parse the prompt and determine that the smart contract data that is retrieved may comprise information for smart contracts that are related to customer bill payments. By way of further example, the smart contract computing system 102 may input the one or more prompts into one or more machine learning models 218, which may be configured and/or trained to retrieve the smart contract data based on criteria that may be parsed from the one or more prompts.

The smart contract data may be retrieved from the plurality of smart contracts and/or from another data source that may comprise the smart contract data. Further, the smart contract data may be retrieved from smart contracts stored on a blockchain. For example, a computing system (e.g., the smart contract computing system 102) may retrieve smart contract data from local storage or from a remote computing system (e.g., distributed ledger platform 104).

The smart contract data for each of the plurality of smart contracts may comprise a smart contact name, a smart contract version, a smart contract author, a smart contract compiler environment, smart contract source code, an application binary interface (ABI), a compiler setting, and/or a smart contract date of creation. The smart contract data may be used to generate merged smart contracts. For example, the smart contract data may be used to determine whether two smart contracts use the same ABI, which may facilitate merging the smart contracts.

The smart contract data may comprise one or more links between the plurality of smart contracts. The one or more links may indicate dependency between two or more of the plurality of smart contracts. For example, a smart contract for a bill payment may comprise a link to another smart contract (e.g., a payment confirmation smart contract) that may be executed once the bill payment has been completed. Further, the one or more merged smart contracts may comprise the one or more links. For example, the one or more merged smart contacts may preserve one or more links to dependent smart contracts that existed in the smart contracts before the smart contracts were merged. Preserving the links may also preserve the functionality of the merged smart contracts by allowing the merged smart contracts to continue to be linked to other smart contracts on which the merged smart contracts may depend.

The one or more generative AI models may be configured to retrieve the smart contract data based on performance of natural language processing (NLP) on the one or more prompts. For example, the one or more generative AI models may use NLP to determine that the prompt "MERGE THE SMART CONTRACTS FOR THIS YEAR'S ACCOUNTING BUDGET" refers to the accounting department and that the smart contract data for smart contracts associated with the accounting department's budget in the current year may be retrieved.

At step 615, a computing system may generate, based on inputting the one or more smart contract data extraction criteria into the one or more generative AI models, a plurality of smart contract clusters. Each of the plurality of smart contract clusters may comprise two or more of the plurality of smart contracts. For example, the smart contract computing system 102 may input the smart contract data into one or more machine learning models 218, which may be configured and/or trained to generate the plurality of smart contract clusters. Generating the plurality of smart contract clusters may comprise testing different combinations of the plurality of smart contracts to determine which of the different combinations meet one or more performance criteria that may indicate whether a smart contract may be merged and/or the performance benefits that may result from merging a smart contract with one or more other smart contracts. For example, the one or more machine learning models 218 may generate millions of different combinations of the plurality of smart contracts, which may comprise different numbers of smart contracts and/or different compositions of smart contracts.

Generating the plurality of smart contract clusters may comprise generating a plurality of abstract syntax trees (ASTs) corresponding to the plurality of smart contracts. The ASTs may indicate the structure of source code in a smart contract. For example, the AST for a smart contract may indicate the branching tree structure of source code that comprises conditional statements that may be used to direct the execution of instructions in a smart contract. Further, generating the plurality of smart contract clusters may comprise determining the plurality of smart contract clusters based on the plurality of ASTs corresponding to the plurality of smart contracts. For example, similarities between ASTs of different smart contracts may be used to determine smart contracts that may comprise redundancies and/or smart contracts that may have similar structures with small differences that may be merged with fewer potential errors than smart contracts with very dissimilar structures.

At step 620, the computing system may determine whether at least one of the plurality of smart contract clusters meets one or more performance criteria. For example, the smart contract computing system 102 may analyze the plurality of smart contract clusters to determine whether a smart contract cluster meets the one or more performance criteria. The one or more performance criteria may indicate whether smart contracts may be merged and/or performance improvements that may result from merging smart contracts.

Determining whether at least one of the plurality of smart contract clusters meets one or more performance criteria may comprise generating a plurality of confidence values corresponding to the plurality of smart contract clusters. The plurality of confidence values may be based on an extent to which the smart contracts in a smart contract cluster meet the one or more performance criteria. Further, the plurality of confidence values may be positively correlated with the extent to which the smart contracts in a smart contract cluster meet the one or more performance criteria.

For example, a smart contract cluster with greater interoperability and higher throughput may correspond to a greater confidence value. Further, determining whether at least one of the plurality of smart contract clusters meets one or more performance criteria may comprise determining the one or more merged smart contracts based on the plurality of smart contract clusters corresponding to the plurality of confidence values that exceed a confidence value threshold. For example, if the confidence values range from one to one-hundred and the confidence value threshold is eighty, then a first smart contract cluster with a confidence value of fifty would not exceed the confidence value threshold and not result in the generation of a merged smart contract based on the smart contracts in the first smart contract cluster. Further, a second mart contract cluster with a confidence value of ninety would exceed the confidence value threshold and result in the generation of a merged smart contract based on the smart contracts in the second smart contract cluster. The confidence value threshold may be determined based on the plurality of confidence value thresholds. For example, the confidence value threshold may be based on a mean or median value of the plurality of confidence values. Further, the confidence value threshold value may be based on a distribution of the plurality of confidence values. For example, the confidence value threshold may be based on the ninetieth percentile of the plurality of confidence values so that only the ninetieth percentile (e.g., the top ten percent) of the plurality of confidence values meet the one or more performance criteria.

The one or more performance criteria may comprise one or more interoperability criteria. The one or more interoperability criteria may indicate an extent to which one or more smart contracts are interoperable and/or compatible with one another. Interoperable smart contracts may comprise one or more links to other smart contracts and/or may comprise values that may be passed to other smart contracts. For example, a smart contract that is used to verify a payment transaction may be interoperable with a smart contract that processes the payment transaction. Meeting one or more interoperability criteria may comprise determining that two or more of the plurality of smart contracts in each of the plurality of smart contract clusters are interoperable. For example, the one or more interoperability criteria may be met if a first smart contract generates values that are subsequently processed by a second smart contract.

The one or more performance criteria may comprise one or more error rate criteria. The one or more error rate criteria may indicate a predicted error rate that may result from merging two or more smart contracts. Meeting the one or more error rate criteria comprises determining that an error rate of the two or more of the plurality of smart contracts in each of the plurality of smart contract clusters does not exceed an error rate threshold.

The one or more performance criteria may comprise one or more response time criteria. The one or more response time criteria may be used to determine whether a response time of a merged smart contract is lower than the response time of executing two smart contracts separately and/or may comprise a response time threshold that may be used to determine if the response time of a merged smart contract is sufficiently low. Meeting the one or more response time criteria comprises determining that a response time of the two or more of the plurality of smart contracts in each of the plurality of smart contract clusters does not exceed a response time threshold. For example, the response time threshold may be one millisecond and smart contract clusters that take less than one millisecond to execute may be determined to meet the one or more response time criteria.

The one or more performance criteria may comprise one or more throughput criteria. The throughput criteria may be used to determine whether a merged smart contract completes some threshold number of operations in a given time frame (e.g., operations per second). Meeting the one or more throughput criteria comprises determining that a throughput of the two or more of the plurality of smart contracts in each of the plurality of smart contract clusters exceeds a throughput threshold. Further, meeting the one or more throughput criteria may comprise the throughput of a merged smart contract being greater than the throughput of the constituent smart contracts being executed separately.

The one or more performance criteria may comprise one or more gas consumption criteria. The gas consumption for a smart contract may comprise a cost associated with executing the smart contract. The one or more gas consumption criteria may indicate a gas consumption threshold beyond which the smart contracts should not be merged. Meeting the one or more gas consumption criteria comprises determining that a gas consumption of the two or more of the plurality of smart contracts in each of the plurality of smart contract clusters does not exceed a gas consumption threshold.

The one or more performance criteria may comprise one or more block confirmation time criteria. The one or more block confirmation time criteria may be used to minimize a block confirmation time of a merged smart contract. Meeting the one or more block confirmation time criteria comprises determining that a block confirmation time of the two or more of the plurality of smart contracts in each of the plurality of smart contract clusters does not exceed a block confirmation time threshold.

At step 625, the computing system may, based on at least one of the plurality of smart contract clusters meeting the one or more performance criteria, perform step 635. For example, a computing system (e.g., the smart contract computing system 102) may determine that a smart contract cluster of the plurality of smart contract clusters meets the one or more performance criteria based on the smart contract cluster having the lowest error rate and the highest interoperability.

Based on at least one of the plurality of smart contract clusters not meeting the one or more performance criteria, the computing system may perform step 630. For example, a computing system (e.g., the smart contract computing system 102) may determine that a smart contract cluster of the plurality of smart contract clusters does not meet the one or more performance criteria based on the smart contract cluster having the highest error rate and the lowest interoperability.

At step 630, a computing system may generate one or more indications (e.g., a message) that the plurality of smart contracts were not merged. For example, the smart contract computing system 102 may generate a message indicating "NO SMART CONTRACTS WERE MERGED" that may be displayed on a display device of the smart contract computing system 102. In some embodiments, the computing system may perform step 605 after completing performance of step 635.

At step 635, a computing system may generate, one or more merged smart contracts comprising the at least one of the plurality of smart contract clusters that meet the one or more performance criteria. Generating the one or more merged smart contracts may comprise copying one or more instructions of each of the plurality of smart contract clusters and generating a merged smart contract. The merged smart contract may comprise one smart contract appended to one or more other smart contracts or one smart contract with some instructions of one or more other smart contracts included in the merged smart contract.

At step 640, a computing system may generate one or more blocks of a blockchain. Each of the one or more blocks of the blockchain may comprise at least one of the one or more merged smart contracts. For example, the smart contract computing system 102 may generate a block that comprises a merged smart contract that comprises the two smart contracts described with respect to FIG. 5. Further, the smart contract computing system 102 may add the one or more blocks to the blockchain stored in distributed ledger platform 104.

FIG. 7 depicts an illustrative method for automatically training a machine learning model to merge smart contracts in accordance with one or more aspects of the disclosure. The steps of a method 700 for automatically training a machine learning model to automatically merge smart contracts may be implemented by a computing device or computing system (e.g., the smart contract computing system 102) in accordance with the computing devices and/or computing systems described herein. One or more of the steps described with respect to FIG. 7 may be omitted, performed in a different order, and/or modified. Further, one or more other steps (e.g., the steps described with respect to FIG. 6) may be added to the steps described with respect to FIG. 7.

At step 705, a computing system may access smart contract training data. The smart contract training data may comprise a plurality of historical smart contracts. Each of the plurality of historical smart contracts may comprise historical smart contract data. The smart contract training data may be similar to the smart contract data described herein and may comprise smart contract data of existing smart contracts. The smart contract training data may be stored in a storage device of the machine learning model training system 108 and/or a remote storage system, and may be accessed by the machine learning model training system 108 in order to train and/or retrain a machine learning model.

At step 710, a computing system may generate a plurality of merged historical smart contracts. Generating the plurality of merged historical smart contracts may be based on inputting the smart contract training data into the one or more generative AI models (e.g., the one or more generative AI models described herein). The one or more generative AI models may comprise the features and/or capabilities of machine learning models described herein including the one or more machine learning models 218 described with respect to FIG. 2 and/or the artificial neural network 300 described with respect to FIG. 3. For example, smart contract training data may be inputted into one or more generative AI models that are implemented on the machine learning model training system 108.

The one or more generative AI models of the machine learning model training system 108 may be configured and/or trained to receive the smart contract training data and perform one or more operations including analyzing the plurality of historical smart contracts. Further, the one or more generative AI models may generate a plurality of merged historical smart contracts that combine two or more of the plurality of historical smart contracts. Further, as part of generating the plurality of merged historical smart contracts, the one or more generative AI models may perform intermediate operations including generating a plurality of historical smart contract clusters from which the plurality of merged historical smart contracts may be generated based on the application of one or more criteria (e.g., the one or more performance criteria described herein). For example, the plurality of merged historical smart contracts may comprise different combinations of smart contracts that are directed to the performance of different types of financial transactions such as bill payment, transaction validation, and/or customer validation.

At step 715, a computing system may determine similarities between the plurality of merged historical smart contracts and a plurality of ground-truth merged smart contracts. The plurality of ground-truth merged smart contracts may comprise different combinations of the plurality of historical smart contracts that when merged resulted in a maximized meeting of the one or more performance criteria (e.g., lowest rate of error and greatest interoperability between historical smart contracts in the plurality of ground-truth merged smart contracts). Determination of the similarities between the plurality of merged historical smart contracts and the plurality of ground-truth merged smart contracts may be based on one or more comparisons of the plurality of merged historical smart contracts to the plurality of ground-truth merged smart contracts. The comparisons of the plurality of merged historical smart contracts to the plurality of ground-truth merged smart contracts may comprise comparing the compositions of the plurality of merged historical smart contracts to the compositions of the plurality of ground-truth merged smart contracts For example, if a ground-truth merged smart contract includes smart contract A, smart contract B, and smart contract C, a first merged historical smart contract includes smart contract A, smart contract B, and smart contract C, and a second merged historical smart contract includes smart contract A, smart contract B, and smart contract D, there may be a determination that the first merged historical smart contract is more similar to the ground-truth merged smart contract than the second merged historical merged smart contract.

At step 720, a computing system may generate, based on the similarity between the plurality of merged historical smart contracts and the plurality of ground-truth merged smart contracts, a smart contract merger accuracy of the one or more generative AI models. Generation of the smart contract merger accuracy may be based on an extent to which the plurality of merged historical smart contracts are similar to the plurality of ground-truth merged smart contracts.

For example, if the plurality of merged historical smart contracts and the plurality of ground-truth merged smart contracts are similar (e.g., the compositions of the plurality of merged historical smart contracts match the plurality of ground-truth merged smart contracts or are within a threshold range of similarity) then the similarity may be determined to be high. If the plurality of merged historical smart contracts are dissimilar (e.g., the compositions of the plurality of merged historical smart contracts do not match the plurality of ground-truth merged smart contracts or are outside a threshold range of similarity) to the plurality of ground-truth merged smart contracts, the similarity may be determined to be low. The smart contract merger accuracy may be positively correlated with the similarity between the plurality of merged historical smart contracts and the plurality of ground-truth merged training smart contracts. Further, the smart contract merger accuracy may be based on an amount of similarities comprising an amount of the plurality of merged historical smart contracts that have the same composition as the plurality of ground-truth merged smart contracts.

At step 725, a computing system may adjust a weighting of a plurality of smart contract parameters of the one or more generative AI models based on the smart contract merger accuracy. For example, the machine learning model training system 108 may increase the weight of the plurality of smart contract parameters that were determined to increase the smart contract merger accuracy and/or decrease the weight of the plurality of smart contract parameters that were determined to decrease the smart contract merger accuracy. Further, some of the plurality of smart contract parameters may be more heavily weighted than other smart contract parameters. The weighting of the plurality of smart contract parameters may be positively correlated with the extent to which the plurality of smart contract parameters contribute to increasing the smart contract merger accuracy. For example, smart contract error rate parameters may be weighted more heavily than smart contract throughput parameters.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air and/or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing system for merging smart contracts, the computing system comprising:

a distributed ledger system comprising a blockchain, wherein the blockchain comprises one or more blocks comprising a plurality of smart contracts;

one or more processors; and memory storing computer-readable instructions that, when executed by the one or more processors, cause the computing system to:

receive one or more prompts comprising a prompt to merge at least two smart contracts of the plurality of smart contracts;

retrieve, from the one or more blocks of the blockchain, based on inputting the one or more prompts into one or more generative artificial intelligence (generative AI) models configured to parse the one or more prompts, smart contract data for the plurality of smart contracts;

generate, based on inputting the smart contract data into the one or more generative AI models, a plurality of smart contract clusters comprising two or more of the plurality of smart contracts;

determine whether at least one of the plurality of smart contract clusters meets one or more performance criteria;

based on at least one of the plurality of smart contract clusters meeting the one or more performance criteria, generate, one or more merged smart contracts comprising the at least one of the plurality of smart contract clusters that meet the one or more performance criteria; and generate, one or more blocks of the blockchain, wherein each of the blocks of the blockchain comprises at least one of the one or more merged smart contracts.

2. The computing system of claim 1, wherein the memory stores additional computer-readable instructions to generate the plurality of smart contract clusters that, when executed by the one or more processors, further cause the computing system to:

generate a plurality of abstract syntax trees (ASTs) corresponding to the plurality of smart contracts; and determine the plurality of smart contract clusters based on one or more similarities between the plurality of ASTs corresponding to the plurality of smart contracts.

3. The computing system of claim 1, wherein the memory stores additional computer-readable instructions to determine whether at least one of the plurality of smart contract clusters meets the one or more performance criteria that, when executed by the one or more processors, further cause the computing system to:

generate a plurality of confidence values corresponding to the plurality of smart contract clusters; and determine the one or more merged smart contracts based on the plurality of smart contract clusters corresponding to the plurality of confidence values that exceed a confidence value threshold.

4. The computing system of claim 1, wherein the one or more generative AI models are configured to parse the one or more prompts based on performance of natural language processing operations on the one or more prompts.

5. The computing system of claim 1, wherein the one or more performance criteria comprise one or more interoperability criteria, and wherein meeting the one or more interoperability criteria comprises determining that the two or more of the plurality of smart contracts in each of the plurality of smart contract clusters are interoperable.

6. The computing system of claim 1, wherein the one or more performance criteria comprise one or more error rate criteria, and wherein meeting the one or more error rate criteria comprises determining that an error rate of the two or more of the plurality of smart contracts in each of the plurality of smart contract clusters does not exceed an error rate threshold.

7. The computing system of claim 1, wherein the one or more performance criteria comprise one or more response time criteria, and wherein meeting the one or more response time criteria comprises determining that a response time of the two or more of the plurality of smart contracts in each of the plurality of smart contract clusters does not exceed a response time threshold.

8. The computing system of claim 1, wherein the one or more performance criteria comprise one or more throughput criteria, and wherein meeting the one or more throughput criteria comprises determining that a throughput of the two or more of the plurality of smart contracts in each of the plurality of smart contract clusters exceeds a throughput threshold.

9. The computing system of claim 1, wherein the one or more performance criteria comprise one or more gas consumption criteria, and wherein meeting the one or more gas consumption criteria comprises determining that a gas consumption of the two or more of the plurality of smart contracts in each of the plurality of smart contract clusters does not exceed a gas consumption threshold.

10. The computing system of claim 1, wherein the one or more performance criteria comprise one or more block confirmation time criteria, and wherein meeting the one or more block confirmation time criteria comprises determining that a block confirmation time of the two or more of the plurality of smart contracts in each of the plurality of smart contract clusters does not exceed a block confirmation time threshold.

11. The computing system of claim 1, wherein the memory stores additional computer-readable instructions that, when executed by the one or more processors, further cause the computing system to:

access smart contract training data comprising a plurality of historical smart contracts;

generate, based on inputting the smart contract training data into the one or more generative AI models, a plurality of merged historical smart contracts;

determine a similarity between the plurality of merged historical smart contracts and a plurality of ground-truth merged smart contracts;

generate, based on the similarity between the plurality of merged historical smart contracts and the plurality of ground-truth merged smart contracts, a smart contract merger accuracy of the one or more generative AI models; and modify a weighting of a plurality of smart contract parameters of the one or more generative AI models based on the smart contract merger accuracy, wherein the weighting of the plurality of smart contract parameters that increase the smart contract merger accuracy is increased, and wherein the weighting of the plurality of smart contract parameters that decrease the smart contract merger accuracy is decreased.

12. The computing system of claim 11, wherein the smart contract merger accuracy is based on an amount of similarity between the plurality of merged historical smart contracts and the plurality of ground-truth merged smart contracts.

13. The computing system of claim 1, wherein the smart contract data for each of the plurality of smart contracts comprises a smart contact name, a smart contract version, a smart contract author, a smart contract compiler environment, smart contract source code, an application binary interface (ABI), a compiler setting, or a smart contract date of creation.

14. The computing system of claim 1, wherein the one or more generative AI models comprise one or more generative pretrained transformer (GPT) models.

15. A method of merging smart contracts, the method comprising:

receiving, by a computing device comprising one or more processors, one or more prompts comprising a prompt to merge at least two smart contracts of a plurality of smart contracts;

retrieving, by the computing device, from one or more blocks of a blockchain, based on inputting the one or more prompts into one or more generative artificial intelligence (generative AI) models configured to parse the one or more prompts, smart contract data for the plurality of smart contracts;

generating, by the computing device, based on inputting the smart contract data into the one or more generative AI models, a plurality of smart contract clusters comprising two or more of the plurality of smart contracts;

determining, by the computing device, whether at least one of the plurality of smart contract clusters meets one or more performance criteria;

based on at least one of the plurality of smart contract clusters meeting the one or more performance criteria, generating, by the computing device, one or more merged smart contracts comprising the at least one of the plurality of smart contract clusters that meet the one or more performance criteria; and generating, by the computing device, one or more blocks of the blockchain, wherein each of the one or more blocks of the blockchain comprises at least one of the one or more merged smart contracts.

16. The method of claim 15, further comprising:

generating, by the computing device, a plurality of abstract syntax trees (ASTs) corresponding to the plurality of smart contracts; and determining, by the computing device, the plurality of smart contract clusters based on one or more similarities between the plurality of ASTs corresponding to the plurality of smart contracts.

17. The method of claim 15, further comprising:

generating, by the computing device, a plurality of confidence values corresponding to the plurality of smart contract clusters; and determining, by the computing device, the one or more merged smart contracts based on the plurality of smart contract clusters corresponding to the plurality of confidence values that exceed a confidence value threshold.

18. The method of claim 15, wherein the one or more generative AI models are configured to parse the one or more prompts based on performance of natural language processing operations on the one or more prompts.

19. The method of claim 15, wherein the one or more performance criteria comprise one or more interoperability criteria, and wherein meeting the one or more interoperability criteria comprises determining that the two or more of the plurality of smart contracts in each of the plurality of smart contract clusters are interoperable.

20. One or more non-transitory computer-readable comprising instructions that, when executed by a computing platform comprising at least one processor, a communication interface, and memory, cause the computing platform to:

receive one or more prompts comprising a prompt to merge at least two smart contracts of a plurality of smart contracts;

retrieve, from one or more blocks of a blockchain, based on inputting the one or more prompts into one or more generative artificial intelligence (generative AI) models configured to parse the one or more prompts, smart contract data for the plurality of smart contracts;

generate, based on inputting the smart contract data into the one or more generative AI models, a plurality of smart contract clusters comprising two or more of the plurality of smart contracts;

determine whether at least one of the plurality of smart contract clusters meets one or more performance criteria;

based on at least one of the plurality of smart contract clusters meeting one or more performance criteria, generate, one or more merged smart contracts comprising the at least one of the plurality of smart contract clusters that meet the one or more performance criteria; and generate, one or more blocks of the blockchain, wherein each of the one or more blocks of the blockchain comprises at least one of the one or more merged smart contracts.

* * * * *